INVENTORS
ROBERT F. ROACH
PAUL A. LAUMANN
PAUL O. KOSBAB

BY

ATTORNEY 3,740,306
MULTIPLE-LAYER PACKAGING FILM WITH
INTERMEDIATE PROTECTIVE LAYER
Paul O. Kosbab, Saukville, and Robert F. Roach and Paul
A. Laumann, Milwaukee, Wis., assignors to Milprint,
Inc., Milwaukee, Wis.
Filed Aug. 6, 1971, Ser. No. 169,710
Int. Cl. B65d 31/02; B32b 15/06, 27/32
U.S. Cl. 161—214                                   25 Claims

ABSTRACT OF THE DISCLOSURE

A packaging film capable of being formed into a collapsible container, such as a toothpaste tube, that includes layers of metal foil, casein admixed with an elastomeric compound, adhesive and heat sealable material joined together, and which is characterized as being able to withstand prolonged storage of fluoride-containing toothpastes without adverse delamination of the layers. The casein-elastomer layer acts as a protective layer that provides retardation of delamination of the other layers of the film when used in a package for fluoride toothpastes.

BACKGROUND OF THE INVENTION

(1) Field

This invention relates to flexible packaging films, particularly such films which are adapted for manufacture into capped tubular containers.

(2) Prior art

There has been a developing interest in replacing metal tubes, such as those of lead or aluminum which are used to package toothpaste, with tubes made from flexible packaging materials which incorporate plastic films such as polyolefin films, etc. In general, this form of collapsible tube container employs a tubular body which is fastened to a cap in order to form the composite tube package.

An early teaching of plastic film tube bodies is illustrated in 2,383,230, wherein films of cellulose derivatives, coated cellulose derivatives, rubber hydrochloride, or vinyl polymer films are proposed as non-metallic collapsible tube containers. The film tube body was to be attached to the tube cap by heat sealing or solvent sealing techniques. However, tubes of this character do not possess the barrier properties required for packaging of present-day fluoride toothpastes.

Heat sealable flexible packaging films such as polyethylene were another early choice for use in this type of construction because their known heat sealing characteristics facilitate manufacture of such tubes in large quantities by allowing heat seal fastening of the tubular body to a cap. It was noted, however that plastic films such as polyethylene were unsuitable for packaging toothpastes and similar dentifrices because the oils and other ingredients, including fluoride compounds, permeated through the polyethylene film. This led to a deleterious degradation of the toothpastes during storage conditions.

The next stage was to employ composite films incorporating a heat sealable material such as polyethylene and the like with a barrier material such as metal foil, particularly aluminum foil. The sealable polyethylene layer is the innermost layer of the film construction in the finished package, and the aluminum foil barrier layer is positioned as an intermediate layer of the film, generally with an exterior layer of a different material selected for its printability also included in the composite construction. A composite film of this construction is effective so far as providing the requisite barrier properties is concerned; however, problems arise from delamination of the film structure under the influence of the fluoride containing toothpaste and also, it is though, because of the essential oils contained therein. Thus, U.S. Pat. 3,260,410 proposes the use of certain ethylene copolymers, such as ethylene-acrylic acid copolymer, as the inner layer of the film in combination with an aluminum foil barrier layer. Another proposal is set forth in U.S. Pat. 3,347,419, according to which ethylene-acrylic acid copolymers are employed as intermediate adhesives for bonding metal foil to inner layers such as polyethylene which are most efficacious for heat sealing properties. The ethylene-acrylic acid copolymer is intended as an adhesive which will resist delamination of other layers of the composite film when packaging fluoride containing toothpastes.

However, the problem still exists, in spite of the several solutions set forth in the prior art, of providing a composite film structure suitable for use in forming a tubular body, such as a toothpaste tube, wherein the several layers of the film are able to withstand prolonged storage of a fluoride containing toothpaste without adverse delamination that will impair the usefulness of the tube package.

SUMMARY OF THE PRESENT INVENTION

Our present invention is based upon the discovery that a multiple layer film incorporating metal foil and an inner heat sealable layer, particularly of polyolefin material, can withstand prolonged storage of fluoride-containing toothpastes if a layer of casein-elastomer is included between the heat sealable layer and the foil layer. Thus, our present film involves a construction incorporating (1) a layer of metal foil barrier, (2) a layer containing casein and elastomer on one surface of the barrier layer, (3) an adhesive layer overlying the casein, and (4) a heat sealable layer overlying the adhesive layer. Other layers, particularly of printable materials such as paper, cellulose, or plastic layers, can be added to the surface of the barrier layer opposite from the casein layer in order to provide a package which can be suitably printed and/or decorated.

One of the principal objects of our invention is to provide a multiple layer flexible packaging film construction having several layers bonded to one another and which includes an intermediate functional layer adapted to eliminate or reduce delamination of the several layers from each other upon packaging a fluoride containing toothpaste and other types of commodities. Another main object is to employ a casein coating as an intermediate layer in a composite film incorporating a metal foil barrier layer and an inner heat sealable layer, which casein coating acts as a protective layer to retard delamination of the layers from one another upon packaging of fluoride-containing dentifrices. A further principal object is to provice a multiple layer packaging film suitable for use as the body of a collapsible tube package. A more specific object of this invention is to provide the particular film constructions and package constructions as hereinafter claimed.

DESCRIPTION OF THE DRAWINGS

The present invention will be illustrated by the ensuing description which makes reference to the accompanying drawings that illustrate a presently-preferred embodiment of the film of this invention. In the drawings.

DESCRIPTION OF PREFERRED EMBODIMENTS

Fluoride toothpastes, or fluoride-containing dentifrices, as those terms are used herein, are meant to encompass any toothpaste, or other dentifrice, which includes a fluoride-containing compound that normally dissociates to yield fluoride ion (F—) in aquous solutions. A variety of effective fluoride-containing compounds are known, see U.S. Pat. 2,876,166, which are non-toxic and normally dissociate in aqueous solution to yield fluoride ions, such as: stannous fluoride, sodium fluoride, $ZnF_2$, $CuF_2$, $NH_4F$, $KF$, $FeF_2$ etc.; complex fluoride containing salts of the same metal ions or ammonia such as fluosilicates, fluostannites, fluotitanates, chlorofluorides, fluophosphates, etc., mixed halides such as the stannous chlorofluorides $SnClF$ and $Sn_2ClF_3$; and mixtures of the foregoing fluoride-containing compounds. The toothpaste usually contains a sufficient amount of the fluoride-containing compound to provide at least 25 parts of fluoride ion per million parts of dentifrice, a concentration of such compound to give 1,000 p.p.m. fluoride ion being a typical level, and with a limit of 4,000 p.p.m. fluoride ion concentration being generally used as a maximum level for reasons of safety. From 0.01 to 0.4% fluorine is another mode of stating the usual concentration range for this ingredient. A polishing agent, water, glycerine, a detergent, fluoride-compatible calcium phosphate compounds, gums, gum tragacanth or alginates, and essential oil flavoring agents are other typical ingredients of the toothpaste mix. The toothpaste may also contain slightly soluble stannous compounds which release stannous ions over a period of time to replace stannous ions that are removed by reaction with other components of the toothpaste, such as stannous tartrate or stannous pyrophosphate, as in U.S. Pat. 2,946,725. Sodium monofluorophosphate as disclosed in U.S. Pat. 3,227,618 is shown therein to provide beneficial effects in a fluoride toothpaste which further enhance its effectiveness for protection against tooth decay. Fluoride toothpastes now enjoy widespread use because of their proven effectiveness in the prevention and control of dental caries. The fluoride-containing dentifrices in general are difficult to package in tubes made of plastic film flexible packaging materials; and those containing sodium monofluorophosphate are particularly difficult to package in such materials—hence, this type of toothpaste is used in the illustrative examples set forth herein below.

Figure 1:
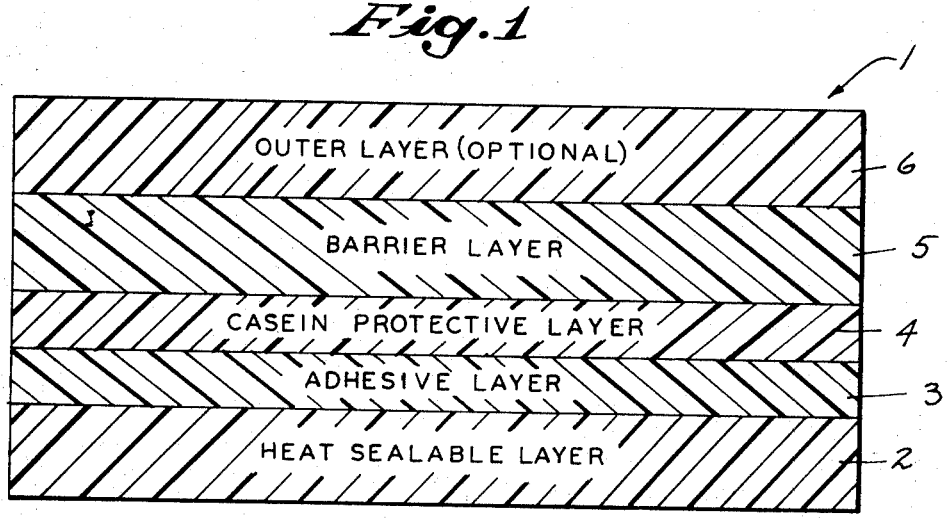
FIG. 1 is a schematic representation of a multiple-layer film according to this invention.

FIG. 1 depicts a sectional view of sheet 1 of the film according to this invention and including the four essential layers: layer 2, layer 3, layer 4 and layer 5. As will be further discussed below, layer 6 is an optional portion of the structure of the film. The layers are firmly joined together to form a composite film.

Layer 2 is to comprise a layer of heat sealable thermoplastic film. Most usefully, the heat sealable layer 2 is to comprise a layer of "polyolefinic material" which term, as used herein and in the claims, is defined as meaning a high molecular weight homopolymer prepared from polymerizable aliphatic 1-olefins (such as ethylene and propylene), including branched-chain aliphatic 1-olefins of this type, interpolymers (including copolymers) of polymerizable aliphatic 1-olefins and one or more copolymerizable compounds containing an ethylenic group such as olefins or ethylenically unsaturated monomers having polar groups wherein the 1-olefin compound is the major (over 50%) ingredient, and modified homopolymers and copolymers of the foregoing types. These materials may be prepared by suitable catalytic techniques, a number of which are known in the art, and many polyolefinic materials of this type are commercially available. U.S. Pat. 3,024,227 describes a process suitable for polymerizing a large number of olefins, and other patents disclose further suitable polymerization techniques. Suitable useful materials include, for example, non-aromatic olefin polymers such as polyethylene, polypropylene, copolymers of ethylene and propylene, copolymers of ethylene and acids such as acrylic acid, and butyl rubber modified high density polyethylene. Polyethylenes include low density polyethylene, medium density polyethylene, and high density polyethylene as those terms are understood in the art. The layer 2 must have heat sealable characteristics in order to enable joinder of a tubular body formed from the film material to an endpiece to make a tube package, as well as joinder of the film to itself in order to form the seams necessary to complete the tubular body or to make other forms of packages. In addition, the heat sealable layer 2 should have barrier properties against at some of the components of a toothpaste or other material packaged in a tube made from the film. The heat sealable layer will generally be on the order of about ½ to 10 mils thick, with thicknesses in the range of 1 to 5 mils being suitable for most applications. The thickness is dependent upon the particular material used and the safety factor desired for a particular end use. The heat sealable layer may be joined to the other layers of the composite film as a pre-formed film by use of lamination techniques or in a molten condition by extrusion coating techniques. When the heat sealable layer is of a polyolefinic material, corona discharge treatment to improve its adhesion may be employed, as is well known in the art.

Layer 3 is to comprise a layer of adhesive for joinder of the seat sealable layer 2 to the other layers in the structure. When a polyolefinic material is used as the layer 2, adhesives such as polyurethane adhesives, polyester adhesives, and polyester-urethane adhesives are particularly effective for layer 3. If other materials are used, suitable adhesives for such materials should be selected, taking into consideration the material which is to be packed in the package made from the film and the shelf life that is desired.

Layer 4 is to comprise a mixture of casein and an elastomeric flexibilizing material. Casein by itself is too brittle to be satisfactory as a protective layer in the flexible packaging film of this invention. However, plasticizers as may normally be used to render casein flexible do not have sufficient water resistance to withstand packaging of a material such as toothpaste which contains substantial amount of water. Suitable elastomeric flexibilizing materials include natural rubber, styrene-butadiene synthetic rubber, neoprene, butadiene-acrylonitrile copolymer, polyacrylate, polyethylene, butyl rubber, polybutene, ethylene polysulfide polymer, or polyvinyl acetate. These elastomeric compounds are added as a latex or water dispersion to a casein water solution to formulate the mixture for the layer 4. The relative proportions of casein and the elastomeric flexibilizing material in the mixture can vary within wide limits from, on a weight basis, about 65% casein and 35% elastomeric flexibilizing material to about 20% casein and 80% elastomeric flexibilizing material, as long as there is sufficient casein in the layer 4 to provide a protective layer as hereinafter described. The layer 4 may also include small quantities, from 1 to 10% by weight, of an insolubilizing compound for the casein as an optional ingredient, particularly when the heat sealable layer 2 is of a material which has relatively low resistance to water permeation. Thus, if butyl rubber modified high density polyethylene is used as the layer 2, the addition of an insolubilizing compound to the casein layer gives improved water resistance, but the insolubilizer need not be used when polypropylene is used as the layer 2. Useful insolubilizing agents include formaldehyde, ureaformaldehyde, melamine-formaldehyde, glyoxal, aluminium formate and hexamine. Further, an accelerator compound for the elastomeric flexibilizing material may also be added to the casein layer in small amounts, from about 1 to 10% on a weight basis, as an optional ingredient. The addition of an accelerator may reduce the weight of elastomeric material needed in the casein layer. The accelerator compound is selected according to known formulating techniques in view of the specific elastomeric compound used as the flexibilizing material. Thus, for example, guanidines, carbamates and thiuram disulfides alone or in combination may be used as accelerators for neoprene, such as diphenylguanidines, diorthologuanidines, zinc dibutyldithiocarbamate (Butyl Zimate), sodium dibutyldithiocarbamate, tetraethylthiuramdisulfide and thiocarbanilide. The casein layer 4 is to be a smooth, continuous, substantially pinhole-free stratum. The weight or thickness of the casein layer in the film structure depends upon the length of the time for which protection against delamination of the film is required with the particular material being packaged. In general, a weight of 2 pounds of the casein layer per 3,000 square sheet of film (about 0.13 mil thick) will give long-term protection as discussed in detail below. A lesser amount of the casein layer may be included in the construction if only short term protection is required, such as 0.2 pound per 3,000 square feet of film (about 0.013 mil thick). The data discussed in connection with the specific examples will demonstrate that the casein layer is an essential layer which protects against delamination of the film in a finished package and that its absence from the film construction provides undesirable results for the present invention. The casein-elastomer layer, however, does not function as an adhesive layer (such as is taught by U.S. Pat. 2,754,240) because it is dried before it is joined to other layers of the film; casein is often used as an adhesive for wet lamination fibrous materials such as paper or wood but the casein is wet when the surfaces to be joined are brought into contact. As discussed below in connection with the specific examples, the present films utilize the casein-elastomer layer in a different manner than as an adhesive and for a different purpose.

Layer 5 is to comprise a layer of barrier material which can resist permeation therethrough of essential oils and other compounds contained in a toothpaste packaged in a tube made from the film, as well as to provide protection against absorption of materials such as oxygen from outside the tube into the packaged goods. Metallic foil having a thickness that will provide the necessary barrier properties is a useful material, particularly aluminum foil. The aluminum foil may be quite thin as long as it has satisfactory barrier properties and can be in the range of ½ to 10 mils thick, with 1 mil thick aluminum foil being suitable for most packaging uses since it provides requisite barrier characteristics and yet is pliable enough to form a flexible packaging film. The problem which arises is that the barrier layer, such as aluminum foil, is subject to chemical attack or corrosion by fluoride compounds; the casein-elastomer layer 4 of the present films has been found to function as a protective layer which prevents or reduces such fluoride attack of the barrier layer. The foil should be substantially free of pinholes when the film is to be used to package fluoride-containing dentifrices, which under current rolling procedures is about ½ mil thick.

The layer 6 is an optional layer which may be added to the exterior surface of the foil barrier layer 5, i.e. the surface opposite from the casein layer 4. When aluminum foil is used as layer 4, it may be printed with suitable identification information, designs, trademark indicia, etc. However, a particular end use may require another material added as an exterior layer 6, and this can be a layer of paper, glassine, cellophane, etc., which can also be printed with any desired designs or information. The exterior layer 6 may comprise a transparent overcoating intended to protect printing applied to the layer 5 or to enhance the glossy appearance of the finished tube; thus a coating of clear polyethylene can be applied as the exterior layer 6. The layer may also be an opaque thermoplastic layer such as opaque polyethylene which contains white pigment to provide a particular background color for the finished container.

Figure 2:
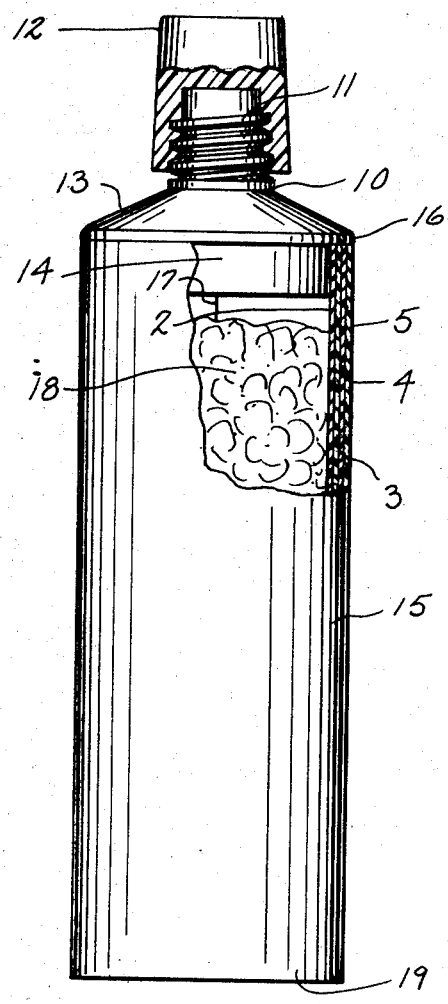
FIG. 2 is a side view, partly broken away, showing a tube package incorporating film of this invention.
Figure 3:
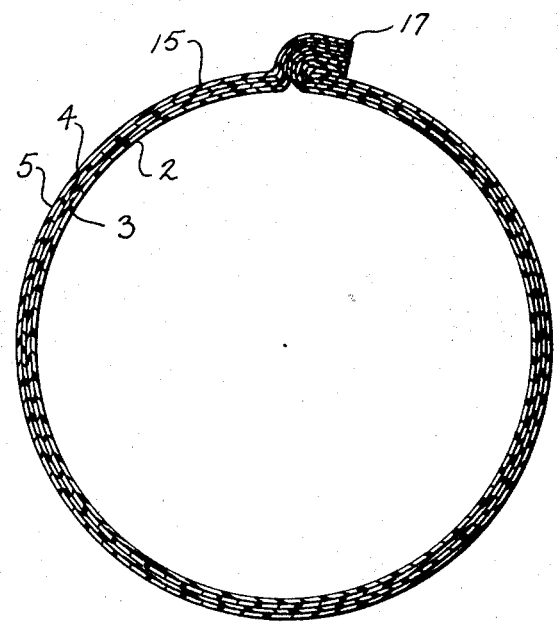
FIG. 3 is a sectional view of the tubular body of the tube illustrated in FIG. 2.

FIG. 2 illustrates a tubular package formed from a sheet of film as illustrated in FIG. 1. An endpiece 10, which may be of a plastic material, includes a threaded nozzle 11 covered by a cap 12, a shoulder portion 13, and a depending annular skirt 14. A sheet of film 1 is rolled into a tube 15 which is heat sealed to the skirt 14 of the cap by means of the portions of the heat sealable layer 2 which contact the annular surface of the skirt 14. Thus the skirt 12 should be of a suitable plastic material such as polyethylene, ethylene-vinyl acetate copolymer, etc., which can form a heat seal bond with the heat sealable layer 2 of the film. The endpiece should be of a material which has barrier properties similar to that of the tube 15, or include a barrier material, for packaging end uses where such barrier protection is needed. The endpiece 10 further includes a circumferential flange 16 which hides the end of the tubular body. As best shown in FIG. 3, the tube body 15 is formed by rolling a sheet of the film 1 into a tube, forming a fin-type seam 17 along contacting marginal portions of the heat sealable layer 2, and then folding the seam 17 to lie flat along the exterior surface of the tube 15. In the usual practice, after the tubular body 15 and endpiece 10 are joined together and the nozzle is closed by a cover, toothpaste 18 is loaded through the open bottom of the tube, following which contacting edge portions of the inner layer 2 are heat sealed together to close the bottom end 19 when the tube is filled with the desired amount of material. Although a tube container is shown herein as an illustrative package, the film of this invention may be utilized to form other types of containers; thus, for example, it can be used to form pouches and bags from a folded sheet of the film 1 or a pair of contacting sheets which are heat sealed together along marginal portions. Materials other than toothpaste can also be packaged in the film of the present invention.

The following Examples 1–16 illustrate a number of films made according to the teachings of our present invention. Various materials are shown as the heat sealable layer 2 of the film construction. Percent refers to percentage on a weight basis unless otherwise noted, and the term "ream" means 3,000 square feet of film. The films of Examples 1–16 were made by first applying the casein-elastomer layer as a water dispersion over a surface of the aluminum foil layer and then drying the layer. Next, the adhesive layer was applied over the casein-elastomer layer as a solvent solution and, after the solvent was removed by drying, the heat sealable layer 2 was dry laminated to the adhesive layer using a hot nip. The heat sealable films for the layer 2 were treated by corona discharge to improve their adhesion.

EXAMPLE 1

A film was made with the following structure:

Layer 2—heat sealable polypropylene (as cast, non-oriented), 1.5 mils thick.
Layer 3—adhesive of polyester-urethane prepolymer, applied at coating weight of 1.8 pounds per ream of film, about 0.12 mil thick.
Layer 4—casein-elastomer layer containing, by weight on a dry solids basis, about 100 parts casein, 175 parts neoprene, 9 parts melamine formaldehyde compound as a casein insolubilizer (Virset 125), and 5 parts zinc dibutyldithiocarbamate as a neoprene accelerator. Applied at coating weight of 4.0 pounds per ream of film, approximately 0.26 mil thick.
Layer 5—aluminum foil, 1.5 mils thick.

EXAMPLE 2

A film was made as follows:

Layer 2—heat sealable polypropylene (as cast, non-oriented), 3.0 mils thick.
Layer 3—per Example 1.
Layer 4—per Example 1.
Layer 5—per Example 1.

EXAMPLE 3

The following film was made:

Layer 2—high density polyethylene, 1.5 mils thick.
Layer 3—per Example 1.
Layer 4—per Example 1.
Layer 5—aluminum foil, 1.5 mils thick.

EXAMPLE 4

A film was made with the same structure as Example 3, except that the casein layer (layer 4) was applied at a coating weight of about 6.0 pounds per ream, approximately 0.4 mil thick.

EXAMPLE 5

A film was made with the same structure as the film of Example 3 except that the high density polyethylene layer (layer 2) was 3.0 mils thick.

EXAMPLE 6

A film was made with the same structure as the film of Example 5 except that the casein layer (layer 4) was applied at a coating weight of about 6.0 pounds per ream of film, approximately 0.4 mil thick.

EXAMPLE 7

A film was made with the following structure:

Layer 2—medium density polyethylene, 3.0 mils thick.
Layer 3—per Example 1.
Layer 4—per Example 1.
Layer 5—per Example 1.

EXAMPLE 8

A film was made with the following structure:

Layer 2—high density polyethylene modified with butyl rubber (Visotherm A), 1.5 mils thick.
Layer 3—per Example 1.
Layer 4—casein layer with same composition as Example 1 except applied at a coating weight of 1.0 pound per ream, about 0.07 mil thick.
Layer 5—aluminum foil, 1.5 mils thick.

EXAMPLE 9

A film was made with the same structure as the film of Example 8 except that the casein layer (layer 4) was applied at a coating weight of 2.0 pounds per ream of film, a thickness of about 0.13 mil.

EXAMPLE 10

A film with the same structure as that of Example 8 was made except that the casein layer (layer 4) was applied at a coating weight of about 4.0 pounds per ream, a thickness of about 0.26 mil.

EXAMPLE 11

A film of the following structure was made:

Layer 2—high density polyethylene modified with butyl rubber (Visotherm A), 3.0 mils thick.
Layer 3—per Example 1.
Layer 4—per Example 1.
Layer 5—aluminum foil, 1.5 mils thick.

EXAMPLE 12

A film was made with the following structure:

Layer 2—low density polyethylene, 3.0 mils thick.
Layer 3—per Example 1.
Layer 4—per Example 8.
Layer 5—per Example 1.

EXAMPLE 13

A film was made with the same structure as the film of Example 12 except that the casein layer (layer 4) was applied at a coating weight of about 4.0 pounds per ream, about 0.26 mil thick.

EXAMPLE 14

A film was made with the following structure:

Layer 2—copolymer of ethylene and acrylic acid, 2.0 mils thick.
Layer 3—per Example 1.
Layer 4—per Example 1.
Layer 5—per Example 1.

The films of Examples 1–14 were tested for their assistance to delamination when used to package an acidic fluoride-containing toothpaste according to the following test. A number of pouches, approximately 2″ by 4¼″, were made from each film with the heat sealable layer 2 arranged as the interior surface of the pouch. Each pouch was loaded with 17 to 18 grams of toothpaste containing sodium monofluorophosphate, which is one of the more difficult fluoride-containing compounds used in toothpastes to package in a flexible paskaging film. The filled pouches were stored at a temperature of 100° F. for a holding time of 13 weeks. The bond strength of the films were measured prior to the start of each test and at periodic intervals throughout the holding period. For the tests following the initial measurement, the pouches were opened and toothpaste removed after which a strip of film was cut from each pouch for the purposes of measuring the bond strength. The bond strength as reported hereinafter is that measured between the inner heat sealable layer 2 and foil barrier layer 5. This was determined by cutting a 1″ wide strip of each film, and measuring the bond strength between the two layers using an Amthor tensile tester with a 12″ per minute separation speed for pulling apart the two layers. Bond strengths are set forth on a grams per inch of width basis. Each number reported in the following Tables I and II represents the average of six determinations at each reading. The results reported in Table I show that the films of Examples 1–14 resist delamination for a prolonged period of time when used to package a fluoride-containing dentifrice. The films of Examples 1 and 2 which have a polypropylene layer 2 show particularly high bond values remaining at the end of the total 13 week holding time test period. Similarly, the films of Examples 3–6 employing high density polyethylene as the heat sealable layer 2 and the film of Example 7 which has medium density polyethylene as the same layer show high bond strength at the end of 13 weeks. The films of Examples 8–11 use butyl rubber modified high density polyethylene as the inner layer 2, and the bond strength results indicate that the higher weight casein-elastomer layers of Examples 10 and 11 show an increase in remaining bond strength at the termination of the holding period; the films of Examples 8 and 9 indicate that a thin casein-elastomer layer combined with a thin inner layer provides suitable bond strength for a shorter period of time, suitable for less rigorous packaging end-uses. Examples 12 and 13 which have low density polyethylene as the heat sealable layer show a similar trend, namely that a thicker casein-elastomer layer increases the length of time the film resists delamination. Example 14 with ethylene-acrylic acid copolymer shows a good bond strength remaining at the end of the 13 week holding period for the test. The films of Examples 1–14 maintained suitable bond strength, for varying periods of time, to provide films useful for packages which can resist delamination for prolonged periods of time under the above test conditions. Thus, even though there is a reduction in the bond strength throughout the period of the holding test, which is to be expected, the effectiveness of the casein layer in retarding the rate of delamination sufficiently to maintain an effective laminated film package is demonstrated. In general, the thickness of the inner layer, the material used for the inner layer and the thickness or weight of the casein-elastomer layer, affect the resistance to reduction in bond strength of the composite film. Further, visual inspection of the films tested as reported in Table I showed there was no staining or corrosion of the foil barrier layer, and no accumulation of liquid between the inner layer and the barrier layer in those films which did not delaminate.

consideration the length of time which the film must be able to resist delamination in view of the shelf life desired for a filled package made from the film.

TABLE I.—BOND STRENGTH IN GRAMS/INCH OF WIDTH FOR FILMS OF EXAMPLES 1-14
[Showing initial bond strength and bond strength after storage at various time intervals at 100° F. of packages filled with 17 to 18 grams of fluoride-containing toothpaste]

| Holding time | Film |||||||||||||||
|---|---|---|---|---|---|---|---|---|---|---|---|---|---|---|
| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 |
| Initial bond | 700 | 1,400 | CNS | CNS | CNS | CNS | CNS | CNS | CNS | CNS | CNS | CNS | CNS | CNS |
| 1 week bond | 1,700 | 1,300 | CNS | CNS | CNS | CNS | CNS | 550 | 650 | 600 | 950 | 700 | CNS | CNS |
| 2 week bond | 1,900 | 1,150 | 1,200 | 900 | 1,600 | 1,300 | CNS | 250 | 300 | 550 | 850 | 400 | 850 | 500 |
| 4 week bond | 1,300 | 1,150 | 750 | 650 | 1,000 | 1,000 | 1,100 | 100 | 100 | 400 | 800 | 100 | 400 | 250 |
| 8 week bond | 1,300 | 1,000 | 300 | 500 | 800 | 900 | 600 | 75 | 50 | 200 | 500 | 50 | 200 | 150 |
| 13 week bond | 500 | 800 | 200 | 450 | 350 | 650 | 300 | D | D | 200 | 350 | D | 100 | 150 |

NOTE.—CNS=Could not separate; D=Delamination of film, no bond strength left.

EXAMPLE 15

This example is included to show the effects of the casein-elastomer layer in the films of this invention. A series of films were made using 3.0 mil thick butyl rubber modified high density polyethylene (per Example 11) as the first layer 2, the same adhesive as in Example 11 as layer 4, and the same foil layer as in Example 11 as the layer 5. A smooth, continuous casein-elastomer layer 4, however, was applied at varying coating weights according to the following schedule:

| | Amount of casein layer, pounds/ream | Approx. thickness of casein layer, mil |
|---|---|---|
| Film: | | |
| A | 0 | 0 |
| B | 0.2 | 0.013 |
| C | 0.5 | 0.033 |
| D | 1.0 | 0.066 |
| E | 2.0 | 0.13 |
| F | 4.0 | 0.26 |

Films A–F of this example were subjected to the same toothpaste holding test described previously, and the bond strengths of the films were measured periodically using the foregoing procedure. The results are reported in Table II.

TABLE II.—BOND STRENGTH IN GRAMS/INCH OF WIDTH FOR FILMS A-F
[Showing initial bond strength and bond strength after storage at various time intervals at 100° F. of packages loaded with 17-18 grams of fluoride-containing toothpaste]

| Holding time | Film ||||||
|---|---|---|---|---|---|---|
| | A | B | C | D | E | F |
| Initial bond | 1,300 | 1,100 | 1,100 | CNS | CNS | 950 |
| 1 week bond | D | 850 | 1,000 | 950 | 940 | 950 |
| 2 week bond | | D | 300 | 500 | 800 | 850 |
| 4 week bond | | | D | 350 | 375 | 800 |
| 8 week bond | | | | 150 | 150 | 500 |
| 13 week bond | | | | 50 | 100 | 350 |

NOTE.—CNS=Could not separate; D=Delamination of film, no bond strength left.

The data of Example 15 as set forth in Table II demonstrate the need to include the casein-elastomer layer in accordance with the present invention in order to provide a laminated film which will resist delamination for packaging the kinds of commodities under consideration. Film A had no casein layer included in the film construction, and the film delaminated completely upon only short exposure to the toothpaste holding test. However, films D, E and F with 1.0, 2.0 and 4.0 pounds of casein layer per ream of film respectively, resisted delamination for the entire thirteen week period of the holding tests. Films B and C with a thinner casein layer resisted delamination for 2 and 4 weeks respectively; thus they can be utilized in a package which requires shorter shelf life against delamination, but the maximum delamination resistance is provided with the films using a thicker or heavier casein layer as in Films E and F. Thus, the amount of the casein layer, expressed in terms of either its coating weight or thickness, to be utilized in a particular film should be determined in accordance with the disclosure herein taking into consideration the length of time which the film must be able to resist delamination in view of the shelf life desired for a filled package made from the film.

EXAMPLE 16

As mentioned previously, one or more layers of various materials can be added to the foil layer on its surface opposite from the casein layer, and this example illustrates a film of such construction:

Layer 2—per Example 11.
Layer 3—adhesive layer per Example 11.
Layer 4—casein layer per Example 11.
Layer 5—foil layer per Example 11.
Layer 6—clear nylon extrusion coating, at a weight of 40–45 pounds of nylon per ream of film.

Before the nylon was extrusion coated onto the foil surface opposite from the surface joined to the casein layer 4, a wash coating of shellac and an underprint lacquer compatible with the shellac were applied to the foil surface according to known techniques. The washed foil surface was printed in an overall opaque white which, in turn, was printed with a design and identification information. The nylon layer was then extrusion coated over the printed, washed surface of the foil.

The film of this example was subjected to the toothpaste holding test described above, and bond strengths measured as previously described. The resulting data are as follows:

| Holding time: | Bond strength, grams/inch of width |
|---|---|
| Initial bond | 1500–1900 |
| 1 week bond | 800–1200 |
| 2 week bond | 1300–1420 |
| 3 week bond | 660–880 |
| 5 week bond | 940–1100 |
| 7 week bond | 800–1000 |
| 10 week bond | 350–450 |
| 13 week bond | 210–225 |

The bond strengths reported above show the range of readings for two determinations for each entry.

The foregoing description has set forth a number of illustrative embodiments of packaging films according to our present invention which have been shown to be capable of withstanding delamination when used to package a fluoride-containing dentifrice. The basic construction of the films involves an inner heat sealable layer and a barrier layer, with a casein-elastomer protective layer positioned intermediate these two layers. A number of useful films have been shown for the inner heat sealable layer, particularly polyolefinic films of polyethylene (low, medium and high density), butyl rubber modified high density polyethylene, polypropylene, and ethylene-acrylic acid copolymer; it should also be noted that the sealable layer may be formed of more than one of the foregoing films for example, a thin layer of polypropylene for enhanced flavor retention combined with a thicker layer of low or medium density polyethylene to impart heat sealability at minimum cost. The barrier layer should be selected in accordance with the degree of barrier protection needed for the material which is to be packaged in a container made from the film; aluminum foil is widely-used barrier layer for many materials, particularly dentifrices. A compatible adhesive layer is incorporated where needed to join the inner heat sealable layer to the casein-elastomer layer of the composite film construction. The casein-elastomer layer is to comprise a mixture of casein and an elastomeric flexibilizing material in order to provide a flexible casein-containing layer which will function suitably in a flexible packaging film and which will provide protection for the barrier layer in accordance with our invention.

The reason for the enhanced protection against delamination when subjected to fluoride-containing dentifrices which is evidenced by the films of our present invention is not fully understood at this time. It is believed, however, that the casein layer functions to absorb fluoride ions which permeate through the packaging film, particularly through the inner heat sealable layer. During the tests conducted as reported hereinabove, those films which did not include a casein layer in accordance with the present teachings would delaminate and visual inspection of the delamination failure disclosed blisters of fluid would build up along the foil surface. This fluid in turn would cause corrosion of the foil barrier that resulted in the formation of holes therethrough so as to destroy its barrier characteristics, and also would cause delamination by attacking or liquifying the adhesive layer. This condition was not observed in films according to this invention which maintained their structural integrity when subjected to the fluoride ions. As has been stated previously, the films of this invention do not utilize the casein-elastomer layer as an adhesive, but instead, it functions as a protective layer for the foil barrier layer of the film and also serves to protect the adhesive layer, thereby protecting against delamination of the film by retardation of the rate of delamination when the film is subjected to fluoride compounds. Delamination can be diminished sufficiently to preserve the joinder of the layers within the composite film for varying time periods as described in the holding test set forth above. A viable multiple layer packaging film is thus maintained wherein each layer is joined to another with a bond exhibiting sufficient strength to retain the several layers in a bonded relationship with respect to one another. In a broader sense, then, the films of the present invention involve a composite multiple-layer structure having one layer which is permeable to one or more components of a material to be packaged within the film (the inner heat sealable layer) and a second layer which forms a barrier to reduce the permeation thereof or which is impermeable thereto (the barrier layer). A casein layer of a specified composition is interposed between the permeable heat sealable layer and the relatively impermeable barrier layer and serves as a layer that absorbs compounds which can chemically attack the barrier layer. Thus, fluoride compounds are held within the casein-elastomer layer described above in such fashion as to prevent them from attacking the foil layer so that the holes or corrosion of the foil layer do not occur. Viewed in a still broader sense, the present films comprise laminated structures including a permeable layer and an impermeable barrier layer with a casein protective layer interposed therebetween which is adapted to package materials containing fugitive compounds that can permeate through the inner permeable layer and attack the impermeable barrier layer, wherein the casein layer functions to absorb such fugitive compounds so that they cannot accumulate or increase in concentration in such manner to cause chemical attack of the impermeable barrier layer. This retention in a protective layer of fugitive compounds which can attack other layers in a packaging film is believed to represent a novel structural combination in the field of flexible packaging films.

While this invention has been described herein with reference to a number of illustrative specific embodiments, changes can be made in the described embodiments and other embodiments, can be devised which will yet remain within the true spirit and scope of the present invention and it is intended to cover all such modifications hereby.

We claim:
1. A multiple-layer packaging film characterized as resisting delamination by a fluoride-containing dentifrice, and further characterized as comprising the following layers firmly joined together;
   (1) a layer of heat sealable thermoplastic material forming a first layer of the film;
   (2) an adhesive layer joined to a surface of the first layer and forming a second layer of the film;
   (3) a casein protective layer joined to a surface of the second layer to form a third layer of the film and comprising a mixture of casein and an elastomeric flexibilizing material; and
   (4) a barrier layer joined to a surface of the casein protective layer and forming a fourth layer of the film.
2. A packaging film according to claim 1 wherein: the first layer is a layer of heat sealable polyolefinic material.
3. A packaging film according to claim 2 wherein: the polyolefinic material is polypropylene.
4. A packaging film according to claim 2 wherein: the polyolefinic material is high density polyethylene.
5. A packaging film according to claim 2 wherein: the polyolefinic material is butyl rubber modified high density polyethylene.
6. A packaging film according to claim 2 wherein: the polyolefinic material is medium density polyethylene.
7. A packageing film according to claim 2 wherein: the polyolefinic material is low density polyethylene.
8. A packaging film according to claim 2 wherein: the polyolefinic material is ethylene-acrylic acid copolymer.
9. A packaging film according to claim 1 wherein: the second layer is a layer of polyurethane adhesive.
10. A packaging film according to claim 9 wherein: the polyurethane adhesive is the reaction product of polyester and a urethane prepolymer.
11. A packaging film according to claim 1 wherein: the third layer includes an insolubilizing compound for the casein.
12. A packaging film according to claim 11 wherein: the insolubilizing compound is formaldehyde or glyoxal.
13. A packaging film according to claim 1 wherein: the third layer is a mixture of casein and an elastomeric natural or synthetic rubbery compound.
14. A packaging film according to claim 11 wherein: the elastomeric material is neoprene.
15. A packaging film according to claim 13 wherein: the third layer includes an accelerator compound for the elastomeric rubbery compound.
16. A packaging film according to claim 1 wherein: the fourth layer is a metallic foil material.
17. A packaging film according to claim 16 wherein: the metallic foil material is aluminum foil.
18. A packaging film according to claim 1 further including:
   a fifth layer joined to the fourth layer on its surface opposite from the third layer.
19. A packaging film according to claim 18 wherein: the fifth layer is nylon.
20. A multiple layer packaging film characterized as resisting delamination by a fluoride-containing dentifrice, and further characterized as comprising the following layers firmly joined together;
   (1) a layer of heat sealable polyolefinic material forming a first layer of the film;
   (2) an adhesive layer joined to a surface of the first layer and forming a second layer of the film;
   (3) a casein protective layer joined to a surface of the second layer to form a third layer of the film and comprising a mixture of casein and an elastomeric flexibilizing material of natural rubber, styrene-butadiene synthetic rubber, neoprene, butadiene-acrylonitrile copolymer, polyacrylate, polyethlyene, butyl rubber, polybutene, ethylene polysulfide polymer, or polyvinyl acetate; and (4) a barrier layer of aluminum foil joined to a surface of the casein protective layer and forming a fourth layer of the film.

21. A packaging film according to claim 20 wherein: the polyolefinic material forming the first layer is polypropylene, polyethylene, ethylene-acrylic acid copolymer, or high density polyethylene modified with butyl rubber.

22. A packaging film according to claim 20 wherein: the casein protective layer includes an insolubilizing compound for the casein and an accelerator compound for the elastomeric flexibilizing material.

23. A packaging film according to claim 11 wherein: the insolubilizing compound is urea-formaldehyde or melamine-formaldehyde.

24. A packaging film according to claim 11 wherein: the insolubilizing compound is aluminum formate.

25. A packaging film according to claim 11 wherein: the insolubilizing compound is hexamine.

References Cited

UNITED STATES PATENTS

| | | | |
|---|---|---|---|
| 2,778,760 | 1/1957 | Hurst | 161—213 X |
| 2,993,806 | 7/1961 | Fisher et al. | 156—90 X |
| 3,295,725 | 1/1967 | Brandt | 222—107 |
| 3,381,818 | 5/1968 | Cope et al. | 206—84 |
| 3,488,252 | 1/1970 | Lamar | 161—213 |
| 3,524,795 | 8/1970 | Peterson | 161—254 X |
| 3,556,816 | 1/1971 | Hughes | 161—214 X |
| 3,558,330 | 1/1971 | Widiger et al. | 161—254 X |
| 3,572,499 | 3/1971 | Mondano | 161—216 X |
| 3,565,293 | 2/1971 | Scultz | 222—107 |
| 3,429,717 | 2/1969 | Cook | 161—256 X |
| 3,579,416 | 5/1971 | Schrenk | 161—256 X |
| 3,661,677 | 5/1972 | Wang | 161—256 X |
| 3,689,334 | 9/1972 | Dermody | 161—254 X |

HAROLD ANSHER, Primary Examiner

U.S. Cl. X.R.

156—90, 328, 336; 161—216, 239, 404; 206—84; 222—107